US009868157B2

(12) United States Patent
Choi et al.

(10) Patent No.: US 9,868,157 B2
(45) Date of Patent: Jan. 16, 2018

(54) CUTTING TOOL ASSEMBLY

(71) Applicant: TAEGUTEC, LTD., Dalsegon-gun, Daegu (KR)

(72) Inventors: Chang Hee Choi, Daegu (KR); Chang Gyu Park, Daegu (KR)

(73) Assignee: TAEGUTEC LTD., Dalseong-gun, Daegu (KR)

( * ) Notice: Subject to any disclaimer, the term of this patent is extended or adjusted under 35 U.S.C. 154(b) by 209 days.

(21) Appl. No.: 14/418,165

(22) PCT Filed: Aug. 6, 2013

(86) PCT No.: PCT/KR2013/007075
§ 371 (c)(1),
(2) Date: Jan. 29, 2015

(87) PCT Pub. No.: WO2014/025187
PCT Pub. Date: Feb. 13, 2014

(65) Prior Publication Data
US 2015/0151364 A1 Jun. 4, 2015

(30) Foreign Application Priority Data

Aug. 8, 2012 (KR) .................. 10-2012-0086927
Jul. 30, 2013 (KR) .................. 10-2013-0090238

(51) Int. Cl.
*B23B 27/00* (2006.01)
*B23B 27/16* (2006.01)
*B23C 5/22* (2006.01)

(52) U.S. Cl.
CPC ........ *B23B 27/1662* (2013.01); *B23C 5/2208* (2013.01); *B23B 2205/04* (2013.01);
(Continued)

(58) Field of Classification Search
CPC ................. B23B 27/1662; B23B 27/1677
See application file for complete search history.

(56) References Cited

U.S. PATENT DOCUMENTS 3,137,059 A * 6/1964 Hertel ................. B23B 27/1622
174/84 R
3,173,191 A * 3/1965 Brown ................ B23B 27/1662
407/104
(Continued)

FOREIGN PATENT DOCUMENTS

CN 101670447 3/2010
JP S53-006989 1/1978

OTHER PUBLICATIONS

Office Action dated Sep. 11, 2015 issued in JP counterpart application (No. 2015-525370).
(Continued)

*Primary Examiner* — Will Fridie, Jr.
(74) *Attorney, Agent, or Firm* — Womble Bond Dickinson (US) LLP

(57) ABSTRACT

A cutting tool assembly has a cutter body, a clamp pin, a cutting insert and a set screw. The clamp pin is inserted to the cutter body to secure the cutting insert to an insert pocket. The set screw is fastened to a threaded hole of the cutter body to press the clamp pin toward the insert pocket. A side surface of the cutting insert contacts a side wall of the insert pocket at a first contact portion. A head of the clamp pin contact an inner peripheral surface of a bore of the cutting insert at a second contact portion. The first and second contact portions are located such that a moment acts on the cutting insert toward the base wall of the insert pocket around the first contact portion.

20 Claims, 9 Drawing Sheets

(52) U.S. Cl.
CPC ... *B23C 2210/165* (2013.01); *Y10T 407/2276* (2015.01); *Y10T 407/28* (2015.01)

(56) References Cited

U.S. PATENT DOCUMENTS

| | | | | |
|---|---|---|---|---|
| 3,289,272 | A * | 12/1966 | Stier | ............... B23B 27/1622 407/101 |
| 3,316,616 | A | 5/1967 | Milewski | |
| 3,491,421 | A * | 1/1970 | Holloway | ............ B23B 27/1662 407/105 |
| 3,740,807 | A * | 6/1973 | Getts | ............... B23B 27/1662 407/101 |
| 3,805,351 | A * | 4/1974 | Mayer | ................ B23C 5/2208 407/104 |
| 4,632,593 | A | 12/1986 | Stashko | |
| 6,158,928 | A | 12/2000 | Hecht | |
| 6,599,060 | B2 * | 7/2003 | Hecht | ............... B23B 27/1662 407/102 |
| 7,347,650 | B2 | 3/2008 | Tipu | |
| 7,431,539 | B2 * | 10/2008 | Erickson | ............ B23B 27/1662 407/104 |
| 8,573,899 | B2 * | 11/2013 | Park | ................ B23B 27/1662 407/105 |
| 8,573,900 | B1 * | 11/2013 | Hecht | ................ B23B 27/045 407/103 |
| 9,033,621 | B2 * | 5/2015 | Hecht | ................... B23C 5/08 407/47 |
| 9,089,910 | B2 | 7/2015 | Hecht et al. | |
| 9,199,313 | B2 * | 12/2015 | Saji | ................ B23B 27/1622 |
| 2003/0031519 | A1 | 2/2003 | Hecht | |
| 2010/0183381 | A1 | 7/2010 | Choi et al. | |
| 2011/0274507 | A1 | 11/2011 | Park et al. | |

OTHER PUBLICATIONS

International Search Report dated Oct. 18, 2013 issued in PCT counterpart application (No. PCT/KR2013/007075).
Office Action dated Jul. 31, 2014 issued in Korean counterpart application (No. 10-2013-0090238).
Office Action dated Jan. 15, 2016, issued in JP counterpart application (No. 2015-525370).
Office Action dated Jan. 19, 2016, issued in CN counterpart application (No. 201380041903.8).

* cited by examiner

[Fig. 1]
(PRIOR ART)
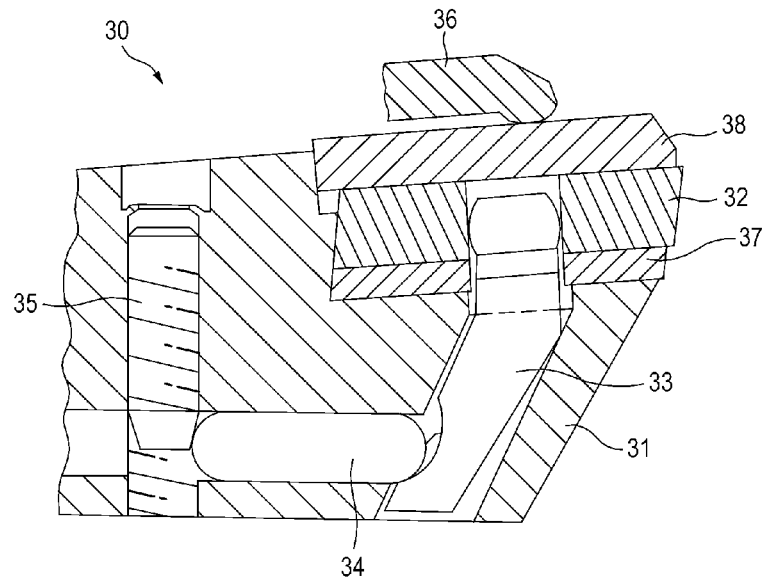
[Fig. 2]
(PRIOR ART)
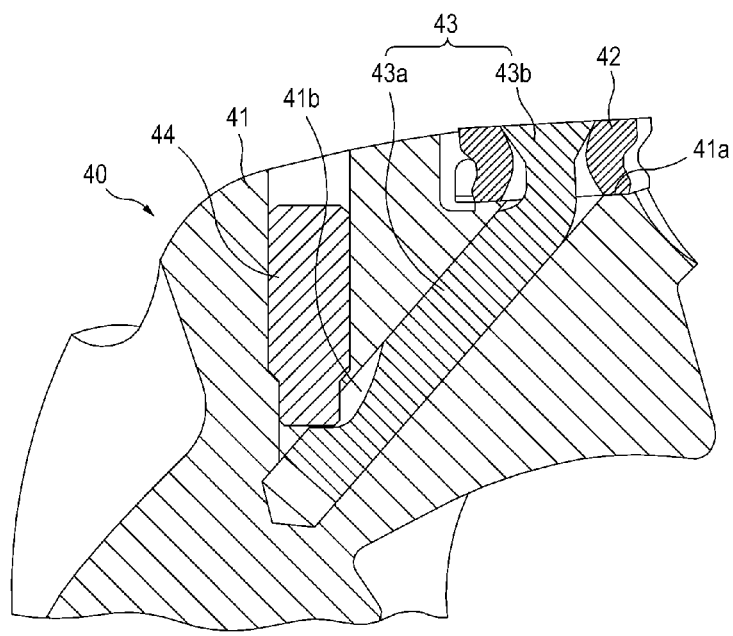

[Fig. 3]
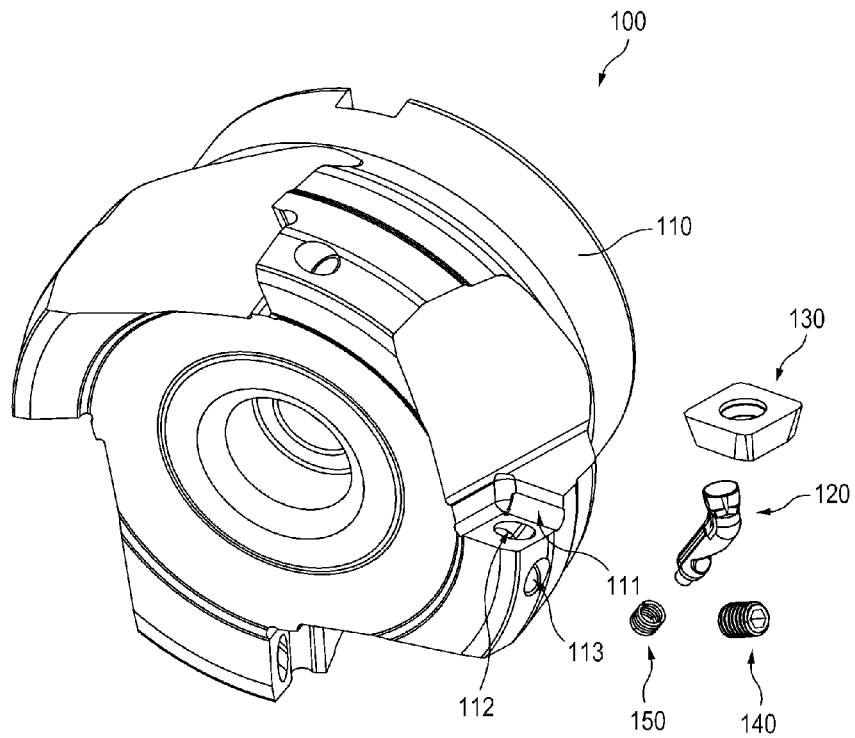
[Fig. 4]
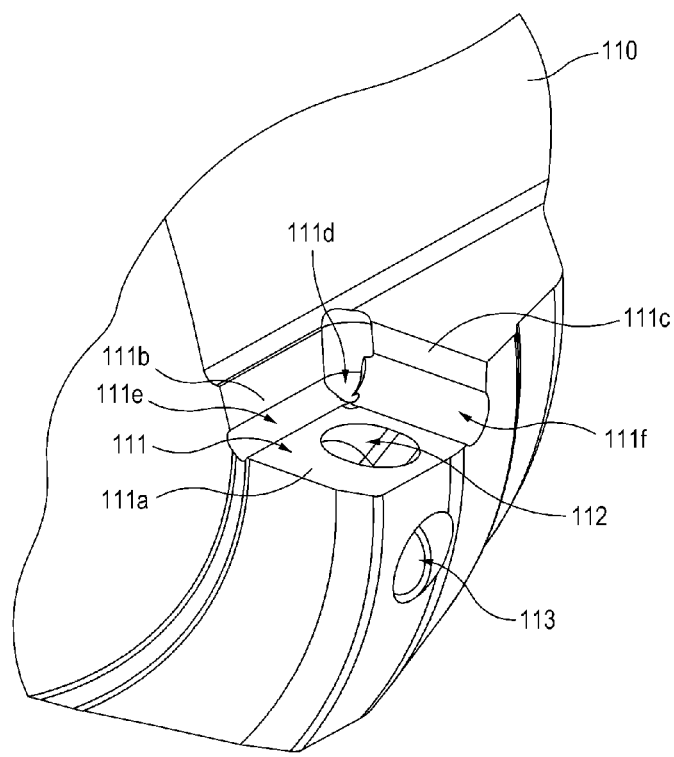

[Fig. 5]
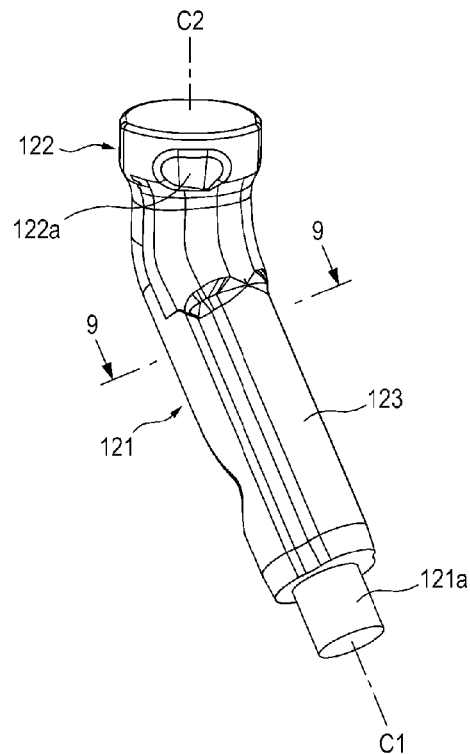
[Fig. 6]
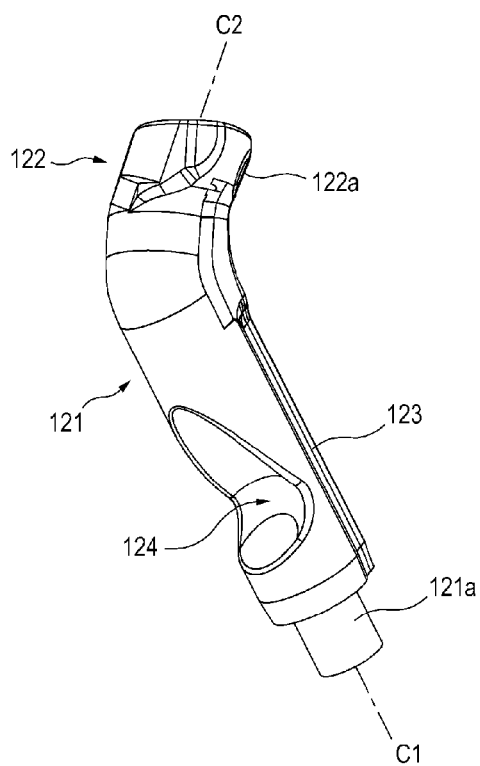

[Fig. 7]
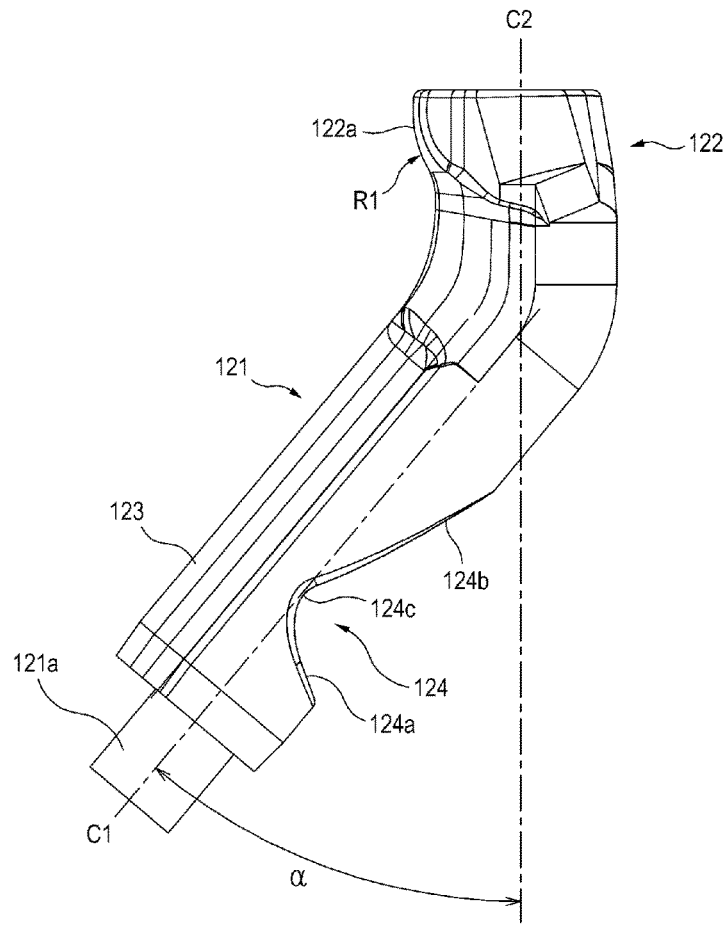
[Fig. 8]
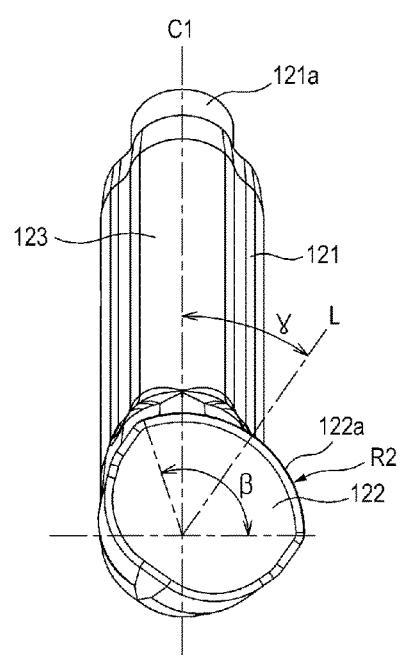

[Fig. 9]
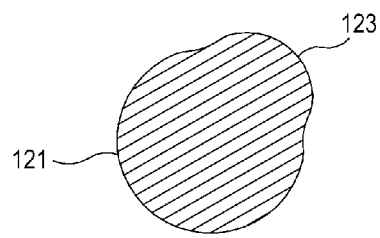
[Fig. 10]
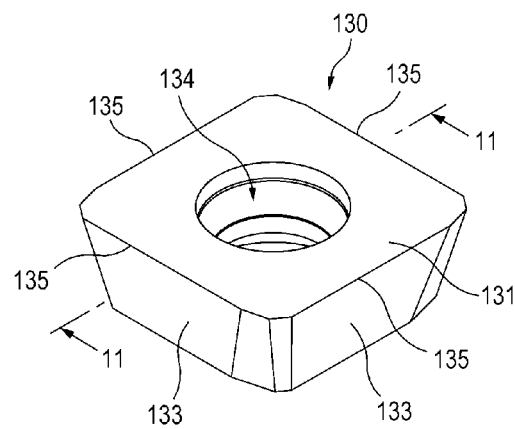
[Fig. 11]
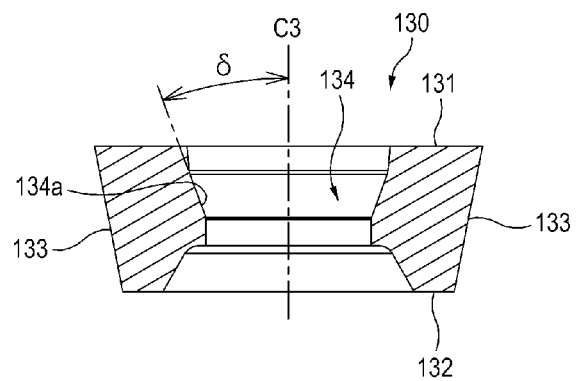

[Fig. 12]
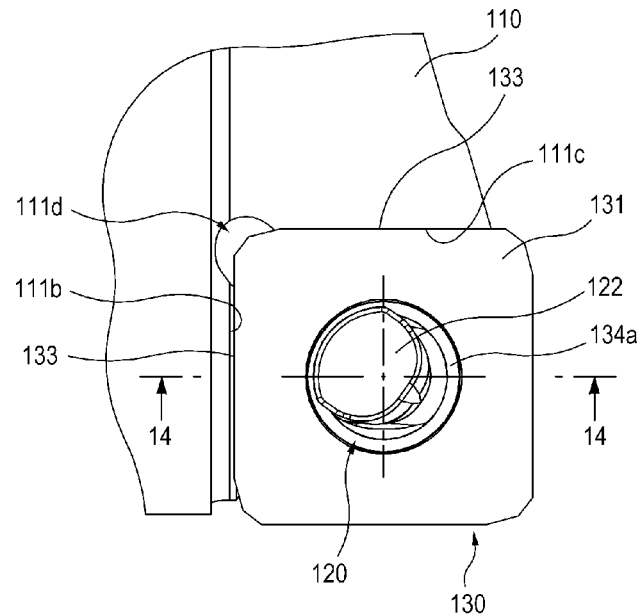
[Fig. 13]
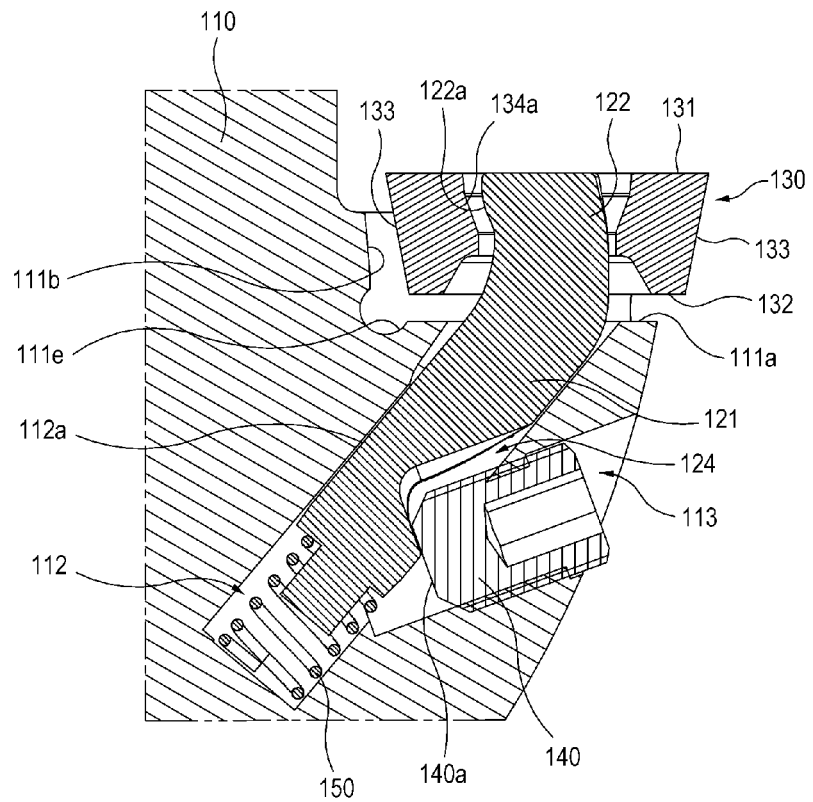

[Fig. 14]
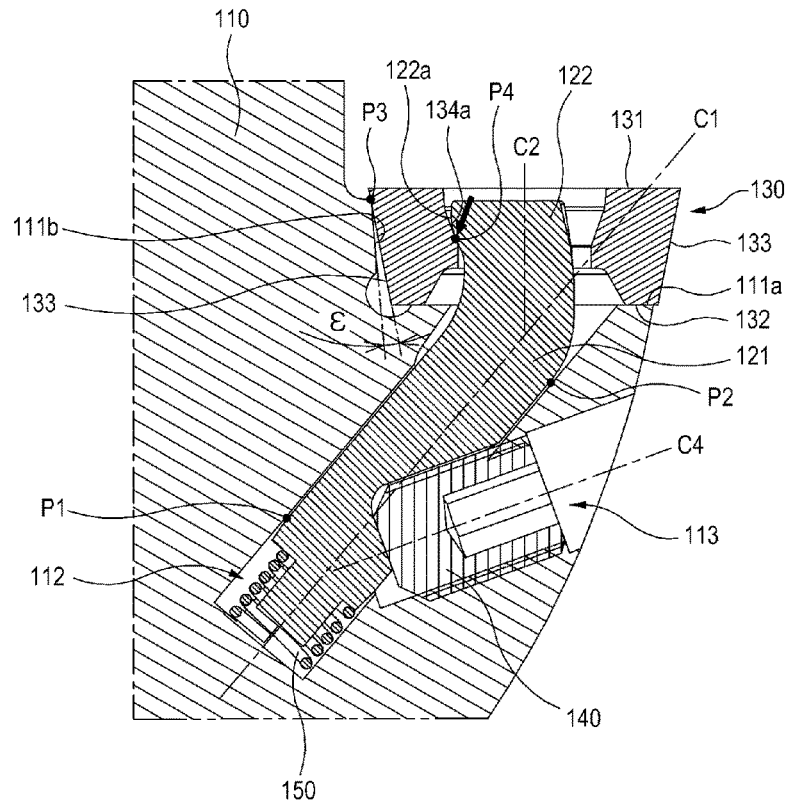
[Fig. 15]
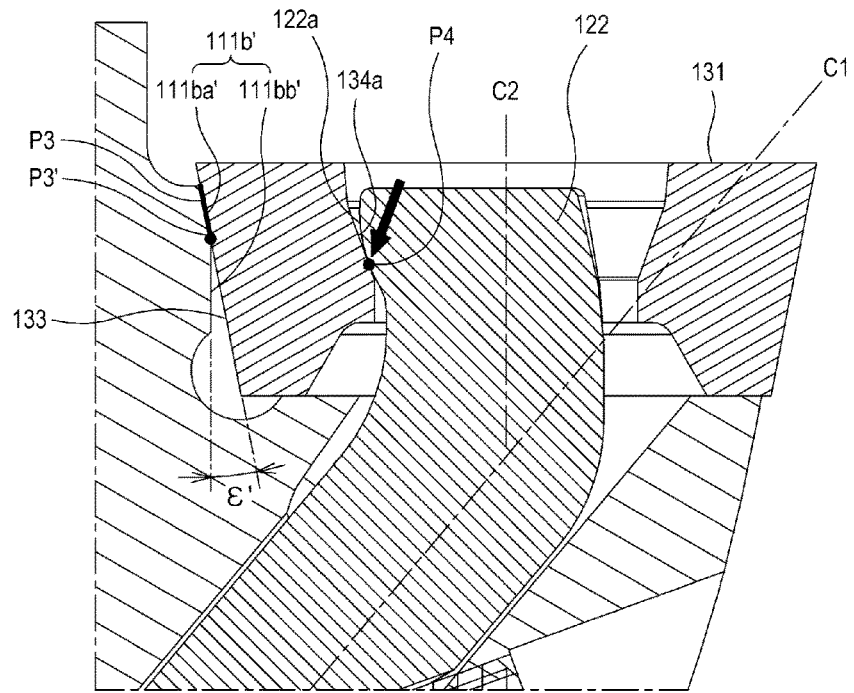

[Fig. 16]
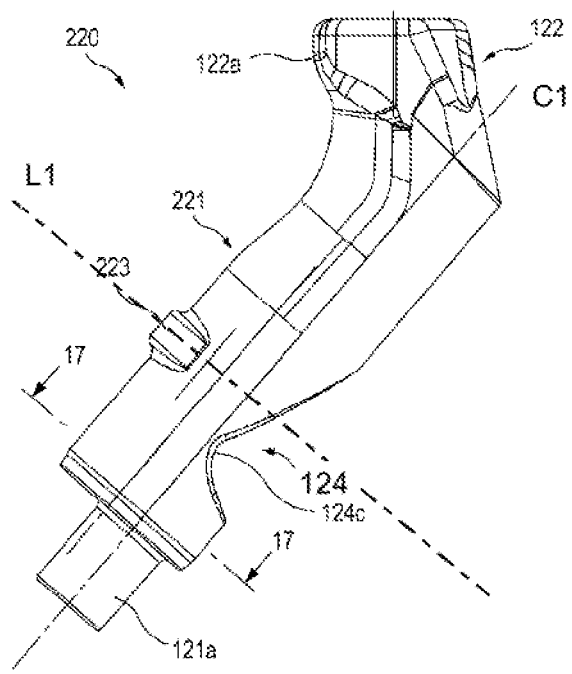
[Fig. 17]
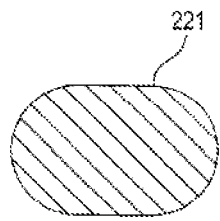

[Fig. 18]
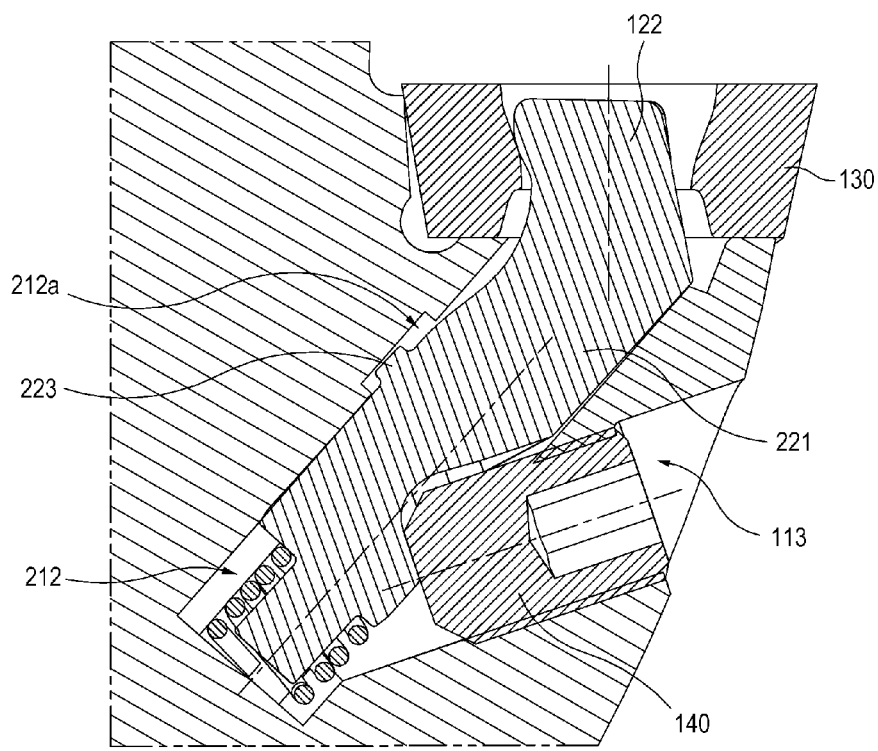

CUTTING TOOL ASSEMBLY

RELATED APPLICATIONS

This is a 35 USC 371 U.S. National Phase of International Application No. PCT/KR2013/007075, filed 6 Aug. 2013 and published in English as WO 2014/025187A1 on 13 Feb. 2014, which claims priority to Korean application no. 10-2012-0086927, filed 8 Aug. 2012 and Korean application no. 10-2013-0090238, filed 30 Jul. 2013. The contents of the aforementioned applications are incorporated by reference in their entirety.

TECHNICAL FIELD

The present invention relates to a cutting tool assembly including a clamp pin for securing a cutting insert to a cutter body.

BACKGROUND ART

A cutting tool for use in a turning operation or a milling operation has a cutting insert that is replaceably mounted in a tool head or a cutter body. FIG. 1 shows a prior art cutting tool disclosed by U.S. Pat. No. 3,316,616. Referring to FIG. 1, the cutting tool 30 has a tool head 31, a cutting insert 32, a tilt pin arrangement and a clamp 36. The tilt pin arrangement includes a tilt pin 33, an intermediate part 34 and a screw 35. As the screw 35 is fastened to the tool body 31, the intermediate part 34 is pushed toward the tilt pin 33 and the tilt pin 33 thus presses the cutting insert 32 against a seat 37. Further, the clamp 36 pushes the cutting insert 32 via a chip breaker 38, thereby securing the cutting insert 32 to the tool head 31.

FIG. 2 shows a milling cutter as another prior art. Referring to FIG. 2, the milling cutter 40 has a cutter body 41, a cutting insert 42, a clamp stud 43 and a set screw 44. The clamp stud 43 has a body 43a and a head 43b. The cutting insert 42 is placed on an insert pocket 41a formed in the cutter body 41. Then, the body 43a of the clamp stud 43 is inserted to a hole 41b formed in the cutter body 41 through the cutting insert 42. Thereafter, the set screw 44 engages the body 43a of the clamp stud 43, thus moving the clamp stud 43 downward along the hole 41b. As such, the head 43b presses the cutting insert 42 to the cutter body 41 and secures the cutting insert 42 to the cutter body 41.

DISCLOSURE OF INVENTION

Technical Problem

To demount the cutting insert 32 from the tool head 31 in the cutting tool 30 shown in FIG. 1, the clamp 36 and the chip breaker 38 should be first removed. Thus, the replacement of the cutting insert 32 is inconvenient and a lot of time is spent for the replacement of the cutting insert 32. Further, a cutting insert having a positive clearance angle may be mounted on the cutting tool shown in FIG. 1. In this case, if the intermediate part 34 presses the tilt pin 33 greatly, then the cutting insert having a positive clearance angle may be moved upward and may be spaced apart from the seat 37. Thus, a clamping force between the tool head 31 and the cutting insert 32 may be weakened.

To demount the cutting insert 42 from the cutter body 41 in the milling cutter 40 shown in FIG. 2, the clamp stud 43 should be completely separated from the hole 41b of the cutter body 41. This also leads to the inconvenient replacement of the cutting insert 42 and a lot of time is spent for the replacement of the cutting insert 42.

The present invention is directed to solving the aforementioned problems of the prior art. The present invention provides a cutting tool assembly, which is capable of firmly securing a cutting insert to a cutter body using a clamp pin regardless of cutting insert types (e.g., a negative type cutting insert, a positive type cutting insert, a double sided cutting insert, etc.).

The present invention is also directed to providing convenience in use. The present invention provides a cutting tool assembly, which can change the direction of a cutting insert or replace the cutting insert without completely separating a clamp pin from a cutter body.

Solution to Problem

In an exemplary embodiment according to the present invention, a cutting tool assembly comprises a cutter body, a clamp pin, a cutting insert and a set screw. The cutter body comprises: an insert pocket having a base wall, two or more side walls and a corner portion between the side walls; a clamp pin hole obliquely extending from the base wall; and a threaded hole inclined with respect to the clamp pin hole and joined to a lower portion of the clamp pin hole at an inner end thereof. The clamp pin comprises: a pin body inserted to the clamp pin hole and having a central axis (C1) extending in a longitudinal direction; a head extending along a central axis (C2) forming an angle ($\alpha$) with the central axis (C1), the head having a pressing surface directed to the corner portion of the insert pocket; and a notch formed at a lower portion of the pin body. The cutting insert comprises: a top surface; a bottom surface; side surfaces located between the top surface and the bottom surface and contacting the side wall of the insert pocket; and a bore having an inner peripheral surface which the pressing surface of the head contacts. The set screw is fastened to the threaded hole, and the set screw engages the notch of the clamp pin and presses the head of the clamp pin toward the base wall of the insert pocket. A first contact portion (P3) where the side surface of the cutting insert contacts the side wall of the insert pocket and a second contact portion (P4) where the pressing surface of the head contacts the inner peripheral surface of the bore are located such that a moment acts on the cutting insert toward the base wall of the insert pocket around the first contact portion (P3).

In an embodiment of the present invention, the first contact portion (P3) is higher than the second contact portion (P4) from the base wall.

In an embodiment of the present invention, the head is twisted at an angle ($\gamma$) relative to the central axis (C2) to be directed to the corner portion. The angle ($\gamma$) may range from 0 degree to 90 degrees.

In an embodiment of the present invention, at least a portion of the side wall excluding the first contact surface (P3) is spaced apart from the side surface at an angle ($\epsilon$, $\epsilon'$). The angle ($\epsilon$) may be 1 degree or less.

In an embodiment of the present invention, the inner peripheral surface of the bore is inclined at an angle ($\delta$) with respect to a central axis (C3) of the bore. The angle ($\delta$) may range from 10 degrees to 60 degrees, preferably from 15 degrees to 30 degrees.

In an embodiment of the present invention, the angle ($\alpha$) may range from 30 degrees to 60 degrees, preferably from 40 degrees to 45 degrees.

In an embodiment of the present invention, a contact angle ($\beta$) between the pressing surface of the head and the inner peripheral surface of the bore ranges from 60 degrees to 150 degrees. The pressing surface of the head contacts the inner peripheral surface of the bore within the contact angle (β) in part.

In an embodiment of the present invention, the cutting tool assembly further comprises a spring disposed between a closed end of the clamp pin hole and a bottom end of the pin body.

In an embodiment of the present invention, the pin body comprises a positioning ridge protruding from the pin body opposite the notch. The positioning ridge extends in a longitudinal direction of the pin body.

In an embodiment of the present invention, the pin body comprises a stopper protrusion protruding from the pin body opposite the notch. The stopper protrusion is above a valley of the notch in the longitudinal direction of the pin body.

In an embodiment of the present invention, the clamp pin hole and the pin body have a cross-section of an oval shape or a racetrack shape.

Advantageous Effects of Invention

In the cutting tool assembly according to the embodiments, the first contact portion where the side surface of the cutting insert contacts the side wall of the insert pocket and the second contact portion where the pressing surface of the head contacts the inner peripheral surface of the bore are located such that a moment acts on the cutting insert toward the base wall of the insert pocket around the first contact portion. Further, the height of the first contact portion from the base wall is greater than the height of the second contact portion from the base wall. Thus, the head of the clamp pin presses the cutting insert toward the base wall of the insert pocket while pressing the side surfaces of the cutting insert against the side walls of the insert pocket. Accordingly, the clamp pin is capable of firmly securing the cutting insert to the insert pocket regardless of cutting insert types.

In the cutting tool assembly according to the embodiments, the cutting insert can be mounted to and demounted from the cutter body as the clamp pin is inserted the cutter body. Thus, the operator can change the direction of the cutting insert and replace the cutting insert without completely separating the clamp pin from the cutter body.

BRIEF DESCRIPTION OF DRAWINGS

FIG. 1 is a sectional view showing a prior art cutting tool.

FIG. 2 is a sectional view showing another prior art cutting tool.

FIG. 3 is an exploded perspective view showing a cutting tool assembly according to one embodiment of the present invention.

FIG. 4 is an enlarged perspective view showing an insert pocket in FIG. 3.

FIG. 5 is a perspective view showing a clamp pin in FIG. 3.

FIG. 6 is a perspective view showing the clamp pin in FIG. 3 in another direction.

FIG. 7 is a side view of the clamp pin in FIG. 3.

FIG. 8 is a top view of the clamp pin in FIG. 3.

FIG. 9 is a sectional view taken along the line 9-9 in FIG. 5.

FIG. 10 is a perspective view showing a cutting insert in FIG. 3.

FIG. 11 is a sectional view taken along the line 11-11 in FIG. 10.

FIG. 12 is a fragmentary top view of a cutting tool assembly wherein a cutting insert is mounted in an insert pocket.

FIG. 13 is a sectional view showing an example of mounting and demounting cutting insert.

FIG. 14 is a sectional view taken along the line 14-14 in FIG. 12.

FIG. 15 is a sectional view showing another example of a first side wall.

FIG. 16 is a side view showing a clamp pin of a cutting tool assembly according to another embodiment of the present invention.

FIG. 17 is a sectional view taken along the line 17-17 in FIG. 16.

FIG. 18 is a sectional view showing that the clamp pin shown in FIG. 16 is mounted in a cutter body.

MODE FOR THE INVENTION

Descriptions will be made as to embodiments of a cutting tool assembly with reference to the accompanying drawings. Like or corresponding components in the drawings are denoted by the same reference numeral.

The cutting tool assembly according to embodiments disclosed herein may be used as a milling cutter that cuts a base surface and a tangential surface of a workpiece. The application of the cutting tool assembly according to embodiments is not limited to such a milling cutter. The cutting tool assembly according to embodiments may be used as a tool for various metal cutting operations.

Reference will be made to FIGS. 3 to 15 to describe a cutting tool assembly according to one embodiment. Referring to FIG. 3, the cutting tool assembly 100 includes a cutter body 110, a clamp pin 120, a cutting insert 130, a set screw 140 and a spring 150.

The cutter body 110 is mounted to, for example, a rotating shaft of a milling machine. The cutter body 110 includes a plurality of insert pockets 111, a clamp pin hole 112 associated with each insert pocket and a threaded hole 113 associated with each insert pocket.

Each insert pocket 111 is configured to accommodate the cutting insert 130.

Referring to FIG. 4, the insert pocket 111 includes a flat base wall 111a, a first side wall 111b, a second side wall 111c and a corner portion 111d. When the cutting insert 130 is mounted in the insert pocket 111 such that cutting edges located at a top surface 131 of the cutting insert 130 cut a workpiece, the base wall 111a is in abutment with a bottom surface 132 of the cutting insert 130 and the first and second side walls 111b and 111c are in abutment with side surfaces 133 of the cutting insert 130. The insert pocket 111 has a first relief groove 111e formed between the base wall 111a and the first side wall 111b and a second relief groove 111f formed between the base wall 111a and the second side wall 111c.

The first and second side walls 111b and 111c are inclined at a predetermined angle with respect to the base wall 111a. Angles between the first and second side walls 111b and 111c and the base wall 111a are determined depending upon an angle between a bottom surface 132 and side surfaces 133 of the cutting insert 130. By way of example, where the cutting insert 130 has a positive clearance angle (i.e., the top surface 131 and the side surface 133 of the cutting insert 130 form an acute angle therebetween), the first and second side walls 111b and 111c are inclined at an obtuse angle with respect to the base wall 111a. The first side wall 111b and the second side wall 111c form a predetermined angle therebetween. The angle between the first side wall 111b and the second side wall 111c is determined depending upon a planar shape of the top surface 131 or the bottom surface 132 of the cutting insert 130. By way of example, where the top surface 131 or the bottom surface 132 has a rectangular planar shape, the first side wall 111b and the second side wall 111c form a right angle therebetween. The corner portion 111d is located between the first side wall 111b and the second side wall 111c.

Referring to FIGS. 4, 13 and 14, the clamp pin hole 112 obliquely extends from the base wall 111a of the insert pocket 111 toward the inside of the cutter body 110. The clamp pin hole 112 receives a pin body 121 of the clamp pin 120. A positioning groove 112a, to which a ridge 123 of the clamp pin 120 is inserted, is provided in the clamp pin hole 112. The threaded hole 113 obliquely extends from an outer peripheral surface of the cutter body 110 toward the inside of the cutter body 110. Further, the threaded hole 113 is inclined at a predetermined angle with respect to the clamp pin hole 112. The threaded hole 113 is joined to the clamp pin hole 112 at a lower portion of the clamp pin hole 112.

Referring to FIGS. 5 to 8, the clamp pin 120 includes the pin body 121, a head 122, the ridge 123 and a notch 124. The pin body 121 is inserted to the clamp pin hole 112 and has a shape of a rod with an approximately circular cross section. The pin body 121 has a spring guide 121a at its bottom end. A diameter of the spring guide 121a is smaller than that of the pin body 121.

As shown in FIGS. 12 and 14, the head 122 contacts an inner peripheral surface 134a of a bore 134 of the cutting insert 130 at at least a portion thereof, not only pressing the cutting insert 130 toward the corner portion 111d but also pressing the cutting insert 130 against the base wall 111a of the insert pocket 111. The head 122 obliquely extends from a top end of the pin body 121. That is, as shown in FIG. 7, a central axis C2 of the head 122 forms a predetermined angle α with a central axis C1 of the pin body 121. Preferably, the angle may range from 30 degrees to 60 degrees. The angle α less than 30 degrees may make it difficult to provide a space for positioning the set screw 140 which fixes the clamp pin 120. In such a case, the set screw 140 must be designed to have a short length, leading to weakening of the fastening force between the set screw 140 and the clamp pin 120. Further, in this case, the set screw 140 can be easily loosened or separated from the threaded hole 113 during cutting operation. The angle α more than 60 degrees reduces the angle between the clamp pin hole 112 and the base wall 111a of the insert pocket 111, thus deteriorating the strength of the cutter body 110 in the vicinity of the base wall 111a of the insert pocket 111. Further, in this case, the pressing forces applied to the cutting insert 130 by the clamp pin 120 are biased toward the side surface 133 and thereby the base wall 111a of the insert pocket 111 and the bottom surface 132 of the cutting insert 130 may be spaced apart from each other. More preferably, the angle α ranges from 40 degrees to 45 degrees. The angle α ranging from 40 degrees to 45 degrees maximizes a close contact force between the base wall 111a of the insert pocket 111 and the bottom surface 132 of the cutting insert 130. Further, it is advantageous to provide the space for positioning the set screw 140.

The head 122 has a pressing surface 122a that contacts the inner peripheral surface 134a of the bore 134. The pressing surface 122a has a circular arc shape with a central angle (or a contact angle) β (see FIG. 8). Preferably, the central angle β may range from 60 degrees to 150 degrees. The central angle β less than 60 degrees shortens a contact portion (e.g., a line or a surface) at which the head 122 is in contact with the inner peripheral surface 134a of the bore 134. Thus, the pressing forces, which are applied to the cutting insert 130 by the head 122 toward the first and second side walls 111b and 111c, may be reduced. Further, too small central angle β may eliminate at least one of the pressing forces which are applied to the cutting insert 130 by the head 122 toward the first and second side walls 111b and 111c, thereby weakening the clamping force between the clamp pin 120 and the cutting insert 130. The greater the central angle β is, the longer would be the contact portion, at which the head 122 is in contact with the inner peripheral surface 134a of the bore 134, and the stronger would be the clamping force clamping the cutting insert 130 to the insert pocket 111. However, if the central angle is more than 150 degrees, then a size of the head 122 may be greater than an inner diameter of the bore 134. Then, unless the clamp pin 120 is separated from the clamp pin hole 112, the cutting insert 130 cannot be mounted to or demounted from the insert pocket 111.

By way of example, the pressing surface 122a may comprise a partial spherical surface. That is, the pressing surface 122a is rounded with a radius of curvature R1 when viewed from side (see FIG. 7) and is rounded with a radius of curvature R2 when viewed from top (see FIG. 8). The pressing surface 122a of this example comes into line contact with the inner peripheral surface 134a of the bore 134 and said line contact takes the shape of a circular arc.

By way of another example, the pressing surface 122a may be straight when viewed side and be rounded with the radius of curvature R2 when viewed from top. The pressing surface of this example comes into surface contact with the inner peripheral surface 134a of the bore 134 and said surface contact takes the shape of a beveled surface of a cone.

The head 122 has the central axis C2 that forms the angle α with the central axis C1 of the pin body 121. The head 122 is twisted relative to the pin body 121 at a predetermined angle γ around the central axis C2. Referring to FIG. 8, a bisector L of a top end surface of the head 122 forms the angle γ with the central axis C1 of the pin body 121. Alternatively, the head 122 may be twisted relative to the pin body 121 at the angle γ in a direction opposite to the twist shown in FIG. 8. The angle γ may range from 0 degree to 90 degrees. When the pin body 121 is inserted to the clamp pin hole 112 and the head 122 is inserted to the bore 134 of the cutting insert 130 (see FIG. 12), the pressing surface 122a is directed to the corner portion 111d of the insert pocket 111. As the set screw 140 is fastened to the threaded hole 113, then the head 122 presses the side surfaces 133 of the cutting insert 130 against the first and second side walls 111b and 111c of the insert pocket 111. Thus, firm contact may be maintained between the side surfaces 133 of the cutting insert 130 and the first and second side walls 111b and 111c.

The ridge 123 extends in a longitudinal direction of the pin body 121 through an entire length of the pin body 121. Further, the ridge 123 protrudes from the pin body 121 in a radial direction (see FIG. 9). The ridge 123 is inserted to the positioning groove 112a of the clamp pin hole 112 to thereby position the clamp pin 120 such that it cannot rotate relative to the clamp pin hole 112. The strength of the pin body 121 may be reduced due to the notch 124, but the ridge 123 may increase the strength of the pin body 121.

As shown in FIGS. 6 and 7, the notch 124 is located opposite the ridge 123 in the vicinity of the lower portion of the pin body 121. The notch 124 is a portion cut away from the pin body 121 in an approximate V shape. The notch 124 has two slope surfaces 124a and 124b and a valley 124c between the two slope surfaces 124a and 124b. The notch 124 receives a portion of the set screw 140 between the slope surfaces 124a and 124b. The set screw 140 engages the notch 124 at its end portion. The set screw 140 contacts the slope surface 124a of the notch 124 at its end surface 140a.

Referring to FIGS. 10 and 11, the cutting insert 130 includes: a rectangular top surface 131; a rectangular bottom surface 132; side surfaces 133 located between the top surface 131 and the bottom surface 132; and a bore 134 passing through the top and bottom surfaces 131 and 132. Cutting edges 135 are defined between the top surface 131 and the side surfaces 133. The bottom surface 132 contacts the base wall 111a of the insert pocket 111. The side surfaces 133 contact the first and second side walls 111b and 111c. A cross-sectional shape of the bore 134 may include a circle, a polygon or a polygon with rounded corners.

As shown in FIG. 11, the side surface 133 forms an acute angle with top surface 131 and an obtuse angle with the bottom surface 132. The inner peripheral surface 134a of the bore 134 has an angle δ with respect to a central axis C3 of the bore 134. The angle δ may range from 10 degrees to 60 degrees. If the angle δ is less than 10 degrees, a force, which acts from a contact portion between the pressing surface 122a and the inner peripheral surface 134a of the bore 134 toward the base wall 111a of the insert pocket 111, is smaller than a force acting from said contact portion toward the first and second side walls 111b and 111c. Thus, a pressing force of the head 122 of the clamp pin 120, which presses the cutting insert 130 against the base wall 111a of the insert pocket 111, may be weakened. If the angle δ is more than 60 degrees, the forces, which acts from the contact portion between the pressing surface 122a and the inner peripheral surface 134a of the bore 134 toward the first and second side walls 111b and 111c, is smaller than the force acting from said contact portion toward the base wall 111a of the insert pocket 111. Thus, a pressing force of the head 122 of the clamp pin 120, which presses the cutting insert 130 against the first and second surfaces 111b and 111c of the insert pocket 111, may be weakened.

This embodiment includes the cutting insert 130 with the rectangular top and bottoms surfaces. The cutting tool assembly according to another embodiment may include a cutting insert having a polygonal shape such as a triangle, a pentagon, etc. Further, the clamp pin employed in the cutting tool assembly according to the embodiments may be applied to a prior art cutting tool wherein a cutting insert is secured to a cutter body by means of a screw.

The set screw 140 engages the threaded hole 113 in screw engagement therewith to secure the clamp pin 120 to the cutter body 110. Although the set screw 140 is not separated from the threaded hole 113 completely, the clamp pin 120 can be moved upwardly to some extent along the clamp pin hole 112. Thus, an operator can quickly replace the cutting insert 130 if he slightly loosens the set screw 140.

The spring 150 is disposed at a closed end portion of the clamp pin hole 112. The spring guide 121a is inserted to the spring 150. The clamp pin 120 is resiliently supported by the spring 150. Thus, the clamp pin 120 needs not to be positioned with respect to the clamp pin hole 112 when mounting and demounting the cutting insert 130. Thus, the operator can easily mount and demount the cutting insert 130. This embodiment includes the spring 150 as a component for resiliently supporting the clamp pin 120, but another embodiment may include an elastic member such as a rubber instead of the spring 150.

Descriptions will be made below as to the example of mounting and demounting cutting insert with reference to FIGS. 13 and 14.

As shown in FIG. 13, the clamp pin 120 is inserted to the clamp pin hole 112 and the spring guide 121a is inserted into the spring 150. Thereafter, the set screw 140 is fastened to the threaded hole 113 and thus the end surface 140a of the set screw 140 engages the notch 124. Then, the clamp pin 120 is resiliently supported by the spring 150 and cannot be separated from the clamp pin hole 112 due to the set screw 140. The cutting insert 130 is seated on the base wall 111a of the insert pocket 111 while the head 122 is inserted to the bore 134 of the cutting insert 130. Thereafter, as the set screw 140 is further fastened to the threaded hole 113, the clamp pin 120 is moved downward along the clamp pin hole 112 due to the engagement with the set screw 140. During said downward movement, the spring 150 is compressed. Further, the side surfaces 133 of the cutting insert 130 come into contact with the first and second side walls 111b and 111c of the insert pocket 111 and the pressing surface 122a of the head 122 comes into contact with the inner peripheral surface 134a of the bore 134. As the set screw 140 is furthermore fastened to the threaded hole 113, the head 122 presses the cutting insert 130 against the corner portion 111d, the base wall 111a and the first and second side walls 111b and 111c. As a result, the cutting insert 130 is secured to the insert pocket 111 by the clamp pin 120 as shown in FIG. 14.

To rotate or replace the cutting insert 130 from the state shown in FIG. 14, the operator has only to unfasten the set screw 140 to a little extent. When the set screw 140 is loosened, the clamp pin 120 is moved upward along the clamp pin hole 112 under the elastic restoration force of the spring 150. At such a state, the operator can mount the cutting insert 130 along the above-described procedures after rotating the cutting insert 130 or replacing it with a new cutting insert.

Reference will be made to FIGS. 14 and 15 for description of the forces that act on the clamp pin and the cutting insert when the cutting insert is secured to the insert pocket by the clamp pin.

The central axis C4 of the threaded hole 113 is inclined with respect to the central axis C1 of the pin body 121 at a predetermined angle. As the set screw 140 presses the clamp pin 120 in an inclination direction of the threaded hole 113, the pin body 121 comes into contact with the clamp pin hole 112 at a first point P1 and a second point P2. Further, the side surface 133 of the cutting insert 130 comes into contact with the first side wall 111b of the insert pocket 111 at a first contact portion P3 and the pressing surface 122a of the head 122 comes into contact with the inner peripheral surface 134a of the bore 134 at a second contact portion P4. The side surface 133 is in line contact or surface contact with the first side wall 111b at the first contact portion P3. The pressing surface 122a is in line contact or surface contact with the inner peripheral surface 134a at the second contact portion P4. The first contact portion P3 and the second contact portion P4 are located such that a moment acts on the cutting insert 130 around the first contact portion P3 toward the base wall 111a of the insert pocket 111 (in a clockwise direction in the example shown in FIG. 14). For example, as shown in FIG. 14, the moment acts in a direction of the arrow at the second contact portion P4. The direction of said arrow is a tangential direction of the second contact portion P4 in an imaginary circle that has a center of the first contact portion P3 and a radius of a distance between the first contact portion P3 and the second contact portion P4. Preferably, the first contact portion P3 is located higher than the second contact portion P4 from the base wall 111a. To this end, heights of the first and second side walls 111b and 111c from the base wall 111a must be less than a height of the cutting insert 130. The larger the difference in the heights of the first and second contact portions P3, P4 from the base wall 111a, the stronger the moment acting on the cutting insert 130 would be. Therefore, when the height difference is large, the bottom surface 132 of the cutting insert 130 comes into close contact with the base wall 111a of the insert pocket 111 and the clamping force produced by the clamp pin 120 is increased.

At least a portion of the first side wall 111b excluding the first contact portion P3 is spaced apart from the side surface 133 of the cutting insert 130 by an angle ϵ, ϵ'. In one embodiment, as shown in FIG. 14, the first side wall 111b, which comprises a single surface, comes into line contact with the side surface 133. In this example, the angle ϵ is an included angle between the side surface 133 and the first side wall 111b relative to the first contact portion P3. In another embodiment, as shown in FIG. 15, the first side wall 111b' comprises a first upper side wall 111ba' and a first lower side wall 111bb'. The first upper side wall 111ba' of the first side wall 111b' comes into surface contact with the side surface 133. In this example, the angle ϵ' is an included angle between the side surface 133 and the first lower side wall 111bb' relative to a lowermost point P3' of the first contact portion P3. Where the side surface 133 is in partial surface contact with the first side wall 111b' as shown in FIG. 15, the point P3' must be located higher than any point of the second contact portion P4. With the above-described angle ϵ, ϵ', the moment, which acts on the cutting insert 130 toward the base wall 111a of the insert pocket 111 around the first contact portion P3 or the point P', can become stronger. Accordingly, the bottom surface 132 of the cutting insert 130 can come into close contact with the base wall 111a of the insert pocket 111 and the side surfaces 133 of the cutting insert 130 can come into close contact with the first and second side walls 111b and 111c of the insert pocket 111. Said angle ϵ may be 1 degree or less, considering permissible tolerances of the insert pocket 111 and the cutting insert 130.

Reference will be made to FIGS. 16 to 18 to describe a cutting tool assembly according to another embodiment.

FIGS. 16 to 17 show a clamp pin 220 of the cutting tool assembly according to another embodiment. The clamp pin 220 includes a pin body 221, the head 122, a stopper protrusion 223 and the notch 124. The head 122 and the notch 124 of the clamp pin 220 of this embodiment have the same configuration as the head 122 and the notch 124 of the clamp pin 120 of the foregoing embodiment shown in FIGS. 3 to 15.

The pin body 221, which is inserted to a clamp pin hole 212 of the insert pocket 111, has a cross-sectional shape of an oval, an oblong, a racetrack or the like (see FIG. 17). Further, the clamp pin hole 212 has a cross-sectional shape corresponding to the cross-sectional shape of the pin body 221. Herein, the oblong or racetrack shape means a shape wherein two semi circles are joined to opposing sides of a rectangle respectively. As such, the pin body 221 and the clamp pin hole 212 have an oval or oblong cross-sectional shape. Thus, when the pin body 221 is inserted to the clamp pin hole 212, the clamp pin 220 is not permitted to rotate relative to the clamp pin hole 212. Further, the oval or oblong cross section reinforces the strength of the pin body 221, which may be weakened due to the notch 124.

The stopper protrusion 223 is located rotationally opposite the notch 124 and protrudes from the peripheral surface of the pin body 221. Thus, an imaginary line L1 passing through the stopper protrusion 223 and perpendicular to the body central axis C1 intersects the notch 124. A length of the stopper protrusion 223 in the longitudinal direction of the pin body 221 is relatively shorter than the entire length of the pin body 221. The stopper protrusion 223 is located above the valley 124c of the notch 124 in the longitudinal direction of the pin body 221. As shown in FIG. 18, the clamp pin hole 212 of the cutter body 110 is provided with a recess 212a that receives the stopper protrusion 223. The pin body 221 may be fractured in the vicinity of the notch 124 during cutting operation and a fractured section of the pin body 221, which is above the notch 124, may escape out of the clamp pin hole 212. However, when the pin body 221 is fractured as such, the stopper protrusion 223, which is located at the fractured section of the pin body 221, may be caught by the recess 212a of the clamp pin hole 212. Thus, the fractured section of the pin body 221 cannot escape out of the clamp pin hole 212.

While the present invention has been described hereinbefore with reference to the foregoing embodiments depicted in the accompanying drawings, the present invention should not be limited thereto. It will be apparent to those of ordinary skill in the art that various substitutions, alternations or modifications may be made without departing from the scope of the present invention.

The invention claimed is:

1. A cutting tool assembly, comprising:
   a cutter body comprising:
      an insert pocket having a base wall, two or more side walls and a corner portion between the side walls;
      a clamp pin hole obliquely extending from the base wall; and
      a threaded hole inclined with respect to the clamp pin hole and joined to a lower portion of the clamp pin hole at an inner end thereof;
   a clamp pin comprising:
      a pin body inserted to the clamp pin hole and having a body central axis (C1) extending in a longitudinal direction;
      a head extending along a head central axis (C2) forming an angle (α) with the body central axis (C1), the head having a pressing surface directed to the corner portion of the insert pocket; and
      a notch formed at a lower portion of the pin body;
   a cutting insert comprising:
      a top surface;
      a bottom surface;
      side surfaces located between the top surface and the bottom surface and contacting the side walls of the insert pocket; and
      a bore having an inner peripheral surface which the pressing surface of the head contacts;
   a set screw fastened to the threaded hole, the set screw engaging the notch of the clamp pin and pressing the head of the clamp pin toward the base wall of the insert pocket, and
   a spring disposed between a closed end of the clamp pin hole and a bottom end of the pin body; wherein:
      a first contact portion (P3) where the side surface of the cutting insert contacts the side wall of the insert pocket and a second contact portion (P4) where the pressing surface of the head contacts the inner peripheral surface of the bore are located such that a moment acts on the cutting insert toward the base wall of the insert pocket around the first contact portion (P3).

2. The cutting tool assembly of claim 1, wherein a height of the first contact portion (P3) from the base wall is higher than a height of the second contact portion (P4) from the base wall.

3. The cutting tool assembly of claim 1, wherein the head is twisted at an angle (γ) relative to the head central axis (C2) to be directed to the corner portion.

4. The cutting tool assembly of claim 3, wherein the angle (γ) ranges from 0 degree to 90 degrees.

5. The cutting tool assembly of claim 1, wherein at least a portion of the side wall excluding the first contact surface (P3) is spaced apart from the side surface at an angle (ϵ,ϵ').

6. The cutting tool assembly of claim 5, wherein the angle (ϵ) is 1 degree or less.

7. The cutting tool assembly of claim 1, wherein the inner peripheral surface of the bore is inclined at an angle (δ) with respect to a bore central axis (C3) of the bore.

8. The cutting tool assembly of claim 7, wherein the angle (δ) ranges from 10 degrees to 60 degrees.

9. The cutting tool assembly of claim 8, wherein the angle (δ) ranges from 15 degrees to 30 degrees.

10. The cutting tool assembly of claim 1, wherein the angle (α) ranges from 30 degrees to 60 degrees.

11. The cutting tool assembly of claim 10, wherein the angle (α) ranges from 40 degrees to 45 degrees.

12. The cutting tool assembly of claim 1, wherein a contact angle (β) between the pressing surface of the head and the inner peripheral surface of the bore ranges from 60 degrees to 150 degrees.

13. The cutting tool assembly of claim 12, wherein the pressing surface of the head contacts the inner peripheral surface of the bore within the contact angle (β) in part.

14. The cutting tool assembly of claim 1, wherein the pin body comprises a positioning ridge protruding from the pin body opposite the notch, the positioning ridge extending in a longitudinal direction of the pin body.

15. A cutting tool assembly, comprising:
a cutter body comprising:
an insert pocket having a base wall, two or more side walls and a corner portion between the side walls;
a clamp pin hole obliquely extending from the base wall; and
a threaded hole inclined with respect to the clamp pin hole and joined to a lower portion of the clamp pin hole at an inner end thereof;
a clamp pin comprising:
a pin body inserted to the clamp pin hole and having a body central axis (C1) extending in a longitudinal direction;
a head extending along a head central axis (C2) forming an angle (α) with the body central axis (C1), the head having a pressing surface directed to the corner portion of the insert pocket; and
a notch formed at a lower portion of the pin body;
wherein the pin body comprises a stopper protrusion protruding from the pin body, the stopper protrusion being rotationally opposite the notch, relative to the body central axis (C1), such that an imaginary line (L1) passing through the stopper protrusion and perpendicular to the body central axis (C1) intersects the notch;
a cutting insert comprising:
a top surface;
a bottom surface;
side surfaces located between the top surface and the bottom surface and contacting the side walls of the insert pocket; and
a bore having an inner peripheral surface which the pressing surface of the head contacts; and
a set screw fastened to the threaded hole, the set screw engaging the notch of the clamp pin and pressing the head of the clamp pin toward the base wall of the insert pocket, wherein:
a first contact portion (P3) where the side surface of the cutting insert contacts the side wall of the insert pocket and a second contact portion (P4) where the pressing surface of the head contacts the inner peripheral surface of the bore are located such that a moment acts on the cutting insert toward the base wall of the insert pocket around the first contact portion (P3).

16. The cutting tool assembly of claim 15, wherein the stopper protrusion is above a valley of the notch in the longitudinal direction of the pin body.

17. The cutting tool assembly of claim 15, wherein the clamp pin hole and the pin body have a cross section of an oval shape or a racetrack shape.

18. A clamp pin for clamping a cutting insert in a cutting tool, the clamp pin comprising:
a pin body having a body central axis (C1) extending in a longitudinal direction;
a head extending along a head central axis (C2) which forms an angle (α) with the body central axis (C1), the angle (α) ranging from 30 degrees to 60 degrees;
a notch formed at a lower portion of the pin body;
a stopper protrusion formed at a lower portion of the pin body and being rotationally opposite the notch, relative to the body central axis (C1), such that an imaginary line (L1) passing through the stopper protrusion and perpendicular to the body central axis (C1) intersects the notch; and
a pressing surface formed on the head;
wherein in a side view of the clamp pin in which the angle (α) appears greatest:
the notch faces in a first direction while the stopper protrusion and the pressing surface protrude in a second direction which is opposite the first direction; and
the body central axis (C1) and the head central axis (C2) form a supplementary angle ranging from 120 degrees to 90 degrees, the supplementary angle opening in the second direction.

19. A cutting tool assembly, comprising:
a cutter body comprising:
an insert pocket having a base wall, two or more side walls and a corner portion between the side walls;
a clamp pin hole obliquely extending from the base wall; and
a threaded hole inclined with respect to the clamp pin hole and joined to a lower portion of the clamp pin hole at an inner end thereof;
a clamp pin in accordance with claim 18 having the pin body inserted into to the clamp pin hole and the pressing surface of the head directed to the corner portion of the insert pocket; and
a cutting insert comprising:
a top surface;
a bottom surface;
side surfaces located between the top surface and the bottom surface and contacting the side walls of the insert pocket; and a bore having an inner peripheral surface which the pressing surface of the head contacts; and a set screw fastened to the threaded hole, the set screw engaging the notch of the clamp pin and pressing the head of the clamp pin toward the base wall of the insert pocket, wherein:

a first contact portion (P3) where the side surface of the cutting insert contacts the side wall of the insert pocket and a second contact portion (P4) where the pressing surface of the head contacts the inner peripheral surface of the bore are located such that a moment acts on the cutting insert toward the base wall of the insert pocket around the first contact portion (P3).

20. The cutting tool assembly of claim 15, further comprising a spring disposed between a closed end of the clamp pin hole and a bottom end of the pin body.

* * * * *